United States Patent [19]
Augenstein

[11] Patent Number: 6,152,402
[45] Date of Patent: Nov. 28, 2000

[54] DUAL SPIN ZERO MOMENTUM SATELLITE SYSTEM

[75] Inventor: David L. Augenstein, Hermosa Beach, Calif.

[73] Assignee: Hughes Electronics Corporation, El Segundo, Calif.

[21] Appl. No.: 09/287,721

[22] Filed: Apr. 7, 1999

[51] Int. Cl.[7] ........................................ B64G 1/28
[52] U.S. Cl. .............................. 244/164; 244/165
[58] Field of Search ......................... 244/158 R, 164, 244/165, 171

[56] References Cited

U.S. PATENT DOCUMENTS

| | | | |
|---|---|---|---|
| 3,877,662 | 4/1975 | Reiter et al. | 244/164 |
| 4,723,735 | 2/1988 | Eisenhaure et al. | 244/165 |
| 4,735,382 | 4/1988 | Pinson | 244/165 |
| 5,014,936 | 5/1991 | Nauck | 244/158 R |
| 5,067,673 | 11/1991 | Fong | 244/165 |
| 5,441,222 | 8/1995 | Rosen | 244/165 |
| 5,611,505 | 3/1997 | Smay | 244/165 |

*Primary Examiner*—J. Woodrow Eldred
*Attorney, Agent, or Firm*—Terje Gudmestad; M. W. Sales

[57] ABSTRACT

An attitude control system for a spacecraft which includes a bearing power and transfer assembly. The bearing power and transfer assembly is disposed between a first body and a second body. The first body and the second body are counter-rotated with respect to each other by the bearing and power transfer assembly such that the overall spacecraft momentum about the spin axis of the bearing and power transfer assembly is nominally zero.

20 Claims, 1 Drawing Sheet

DUAL SPIN ZERO MOMENTUM SATELLITE SYSTEM

TECHNICAL FIELD

The present invention relates to a dual spin zero momentum system with a bearing and power transfer assembly to counterspin two portions of a spacecraft relative to each other such that the system momentum along the spin axis is nominally zero.

BACKGROUND ART

Various spacecraft payloads, such as in scientific or classified applications, must have their spin axis positioned other than nominally orbit normal, for example towards Earth, throughout their orbit in order to operate properly. If the momentum of the spinning payload is not counterbalanced in some manner, torques, such as through thrusters must be applied continuously to precess the momentum vector around the orbit to keep the payload spin axis pointed in the desired direction. If the payload has significant inertia or spins at a high rate, the resulting torque requirements can place excessive demands upon the system in terms of weight, cost, and power (large magnetic torques, excessive thruster firings, etc.).

To eliminate the use of standard momentum control techniques to counterbalance the payload, apparatus for providing a dual spin zero momentum satellite have been developed. The dynamic equations of motion for these dual spin zero momentum satellites are well known and were disclosed in a book written by Peter C. Hughes entitled *Spacecraft Attitude Dynamics* published by John Wiley & Sons 1986, at pages 164–65. However, Mr. Hughes in this article did not discuss or provide any hardware implementations of these dynamic equations. In fact, the primary conclusion of his article was that the architecture did not provide any novel possibilities over those currently used for spacecraft stabilization since the spacecraft behaves qualitatively like a non-spinning body.

While some current spacecraft attitude control systems obey the equations in Hughes' article, they suffer from a variety of problems. For example, the current dual spin zero momentum systems use a reaction wheel to counterbalance the momentum of the spinning satellite. The primary disadvantages of these systems that utilize a reaction wheel counterbalance are that they are heavy, require more power than is necessary to counterbalance the satellite momentum using the approach of the present invention, and are very expensive.

For example, it is known that the reaction wheel in the prior DSP system stores about 1800 ft-lb-s of momentum, weighs approximately 180 lbs., and draws 40 W of power at steady state, and costs approximately $1.5 million. A further disadvantage of a satellite system utilizing a reaction wheel is that the wheel can also limit the rotation of the payload to unacceptably low rates. For example, the reaction wheel utilized in the current DSP spacecraft system has the largest momentum storage capacity of any reaction wheel currently available on the market. This reaction wheel stores about 1800 ft-lb-s so the allowable momentum of the spinning payload is also limited to 1800 ft-lb-s without redesign of the wheel.

SUMMARY OF THE INVENTION

The present invention relates to a method and apparatus for attitude control of a spinning spacecraft which is configured so that its spin axis attitude is not nominally inertially fixed throughout its orbit (for example pointed at Earth).

It is a further object of the present invention to provide a dual spin zero momentum system that is capable of generating an equivalent amount of momentum to counterbalance the momentum of a spinning payload that weighs less, requires less power, and costs less than prior spacecraft systems.

In accordance with the objects of the present invention, an attitude control system for providing dual spin zero momentum is provided. The spacecraft includes a first body positioned at a first end which is spinning in one direction. The spacecraft includes a second body that is positioned at a second end of the spacecraft opposite the first end. The second body is spinning in a direction opposite the direction of rotation of the first body. A bearing and power transfer assembly ("BAPTA") having a first end and a second end is disposed between the first body and the second body. The first end of the BAPTA is in communication with the first body causing it to rotate. The second end of the BAPTA is in communication with the second body causing it to rotate with respect to and in the opposite direction as the first end of the BAPTA and the first body. The first end of the BAPTA and the second end of the BAPTA share a spin axis and counterbalance the overall system momentum of the spacecraft such that the system momentum is nominally zero along the BAPTA spin axis.

In accordance with a further object of the present invention, the first body (body A) can be a payload module and the second body (body B) can be a bus module which are counterspun with respect to one another. This arrangement provides a satellite with nominally zero momentum along the spin axis of a bearing and power transfer assembly ("BAPTA") disposed between the payload module and the bus module. The BAPTA maintains a relative rotation rate of body A with respect to body b of $\omega_A*(1+I_A/I_B)$, where $\omega_A$ is the angular velocity of the body A, and $I_A$ and $I_B$ are the moments of inertia of body A and body B respectively.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1b is an illustration of an (XYZ) coordinate system to provide orientation for the spacecraft with a bearing and power transfer assembly shown in FIG. 1a.

BEST MODE(S) FOR CARRYING OUT THE INVENTION

Figure 1A:
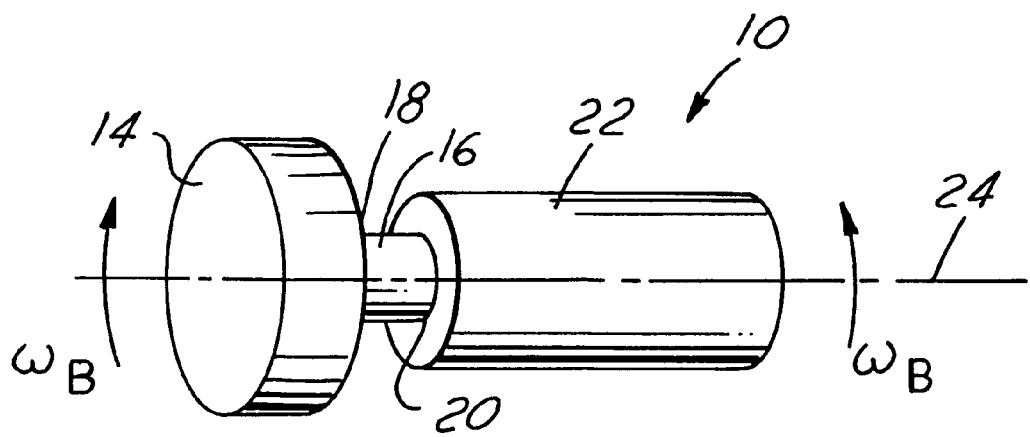
FIG. 1a is a perspective view of a spacecraft with a bearing and power transfer assembly in accordance with a preferred embodiment of the present invention.

FIG. 1a illustrates a spacecraft 10 or satellite in accordance with a preferred embodiment of the present invention. While the present invention is illustrated and described in connection with a satellite, it should be understood that the present invention may be applied to any space mission with a spinning payload which does not want to have the payload spin axis attitude nominally inertially fixed. Various directional terms, such as "x axis", "y axis," and "z axis" are utilized herein. These terms however, are only used for directional illustration and are not intended to be limiting.

As shown in FIG. 1a, the spacecraft 10 has a first body (body A) 14 in rotational communication with a bearing and power transfer assembly 16 ("BAPTA"). The structure of the BAPTA and their general use are well known to those of ordinary skill in the art. See U.S. Pat. No. 5,014,936. The BAPTA 16 has a first end 18 that is preferably in communication with the first body 14 and a second end 20 that is preferably in communication with a second body (body B) 22. The first end 18 of the BAPTA 16 is counter-rotatable with respect to the second end 20 of the BAPTA so that they can simultaneously rotate in opposite directions. The first end 18 and the second end 20 define a spin axis 24 which is preferably formed through the center of the spacecraft 10.

The BAPTA 18 is preferably used to counterspin a payload with respect to a bus portion or solar drum. By utilizing the BAPTA 16 to counterspin the payload with respect to the solar drum in this manner, the overall momentum of the spacecraft 10 along the spin axis 24 can be reduced to nominally zero. It should be understood, however, that the BAPTA 16 may be utilized to counterspin any two portions of the spacecraft 10 with respect to each other, including, for example, a payload portion with respect to a bus portion. Moreover, the present invention may be configured such that either the payload portion or the bus portion is the first body 14 or such that either the payload portion or the bus portion is the second body 22.

Figure 1B:
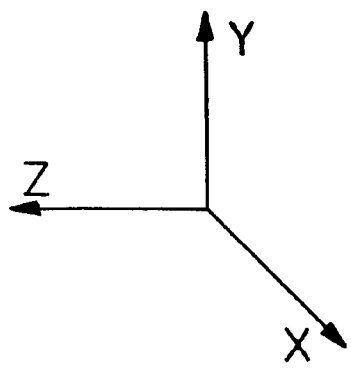

Referring now to FIG. 1a which schematically illustrates the preferred architecture for providing a dual spin zero momentum spacecraft 10. FIG. 1b illustrates the X axis, Y axis, and Z axis. As shown in the Figures, the first body (body A) 14 and the second body (body B) 22 are in mechanical contact with each other through the BAPTA 16 disposed therebetween. The spacecraft 10 is positioned such that the Z-axis is parallel with the spin axis 24 of the BAPTA 16. The first end 18 of the BAPTA 16 causes the first body 14 to rotate in one direction while the second end 20 of the BAPTA 16 causes the second body 22 to rotate in the opposite direction as the first body 14.

When rotating, the first body 14 has a moment of inertia $I_A$, about the Z-axis while the second body 22 has a moment of inertia $I_B$ about the Z-axis. To provide nominally zero system momentum about the Z-axis, assuming the first body 14 spins at an inertial rate $\omega_A$ about the Z axis, then the second body 22 must be spun by the BAPTA 16 at a nominal inertial rate of $-\omega_A * I_A/I_B$ about the Z axis. Thus, to provide nominally zero system momentum about the Z-axis, the relative rotation rate of the first body 14 with respect to the second body 22 that must be maintained by the BAPTA 16 is equal to $\omega_A*(1+I_A/I_B)$.

It is well known that environmental torques and spacecraft maneuvers can cause the spacecraft's overall Z-axis momentum to deviate from zero. The invention can use any standard momentum control techniques (thrusters, magnetic torquers, etc.) to maintain the total Z-axis momentum of the spacecraft about a nominal state of zero. While suboptimal if it is desired to maneuver the spacecraft Z-axis in inertial space, the fundamental attributes of the invention can be maintained if the spacecraft operates with a small momentum bias.

Rather than employing gyroscopic spin stabilization, the present invention relies on three axis stabilization for general applications using any appropriate set of satellite actuators (thrusters, magnetic torquers, etc.). If it is desired to point the Z-axis at the center of a large gravitational mass such as Earth, the invention could alternatively employ gravity gradient stabilization. In this case, a boom could be extended along the spin axis 24 to make the spin axis moment of inertia the smallest principal moment of inertia so that the gravity gradient torque will cause the spin axis to point at the center of the large gravitational mass.

In an alternative embodiment, a nonstandard option for three axis control utilizing the BAPTA 16 is employed that is similar to that disclosed in U.S. Pat. No. 5,441,222. In this embodiment, the BAPTA 16 is gimbaled relative to the first body 14 and/or the second body 22. In another alternative embodiment, the product of inertia in the first body 14 and/or the second body 22 could be used in a manner similar to that used for despun active nutation damping (DAND) on some current spacecraft.

By utilizing the BAPTA 16 to spin an entire portion of the spacecraft 10, the system of the present invention is able to generate an equivalent amount of momentum at a much lower weight, power, and cost than prior momentum counterbalance systems. A spacecraft 10 utilizing a BAPTA 16 in accordance with the present invention, for example, can generate an equivalent amount of momentum as the prior reaction wheel spacecraft by spinning the solar drum and the BAPTA weighs about 24 pounds, draws only 5 W of power, and costs less than $500,000.

Further, by using a BAPTA 16 to counterspin the bus module (second body 22) relative to the payload module (first body 14), the allowable momentum of the spinning payload module can be increased simply by increasing the spin inertia of the bus module.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. An attitude control system for a spinning spacecraft, comprising:
    a first body positioned at a first end of said spacecraft and spinning in a first direction;
    a second body positioned at a second end of said spacecraft opposite said first end and spinning in a direction opposite said first direction;
    a bearing and power transfer assembly having a first end in communication with said first body and a second end in communication with said second body and having a spin axis;
    whereby said spacecraft has an overall momentum about said bearing and power transfer assembly spin axis with a magnitude that is less than 25% of the larger of the momentum magnitude of said first or second body about said bearing and power transfer assembly spin axis.

2. The attitude control system of claim 1, wherein said overall momentum of said spacecraft is nominally zero.

3. The attitude control system of claim 2, wherein said bearing and power transfer assembly spin axis maintains an attitude that is not nominally inertially fixed.

4. The attitude control system of claim 3, wherein said spacecraft is a satellite.

5. The attitude control system of claim 4, wherein said spin axis is pointed at Earth as said spacecraft is in an orbit.

6. The attitude control system of claim 5, wherein said first body is a payload module.

7. The attitude control system of claim 6, wherein said second body is a bus module.

8. The attitude control system of claim 7, wherein said payload module spins at a nominal desired inertial rate of $\omega_A$ about said spin axis.

9. The attitude control system of claim 8, wherein said bus module spins at a nominal desired inertial rate of $-\omega_A*I_A/I_B$ about said spin axis to maintain nominal zero momentum for said system about said spin axis, wherein $\omega_A$ is the angular velocity of said first body, $I_A$ is the moment of inertia of said first body, and $I_B$ is the moment of inertia of said second body.

10. The attitude control system of claim 9, wherein said bearing and power transfer assembly maintains a nominal relative rotation rate of said payload module with respect to said bus module of $\omega_A*(1+I_A/I_B)$.

11. An attitude control system for a satellite as it spins about a spin axis of the satellite during an orbit about Earth, comprising:

a payload module having a spin axis;

a bus module having a spin axis that is the same as said payload module spin axis;

a bearing and power transfer assembly in communication with said payload module and said bus module and having a spin axis that is the same as said payload module spin axis;

whereby said bearing and power transfer assembly spins said bus module relative to said payload module such that the satellite has an overall momentum during said orbit that is less than 25% of the larger of the momentum magnitude of said payload or bus module about said spin axis of said bearing and power transfer assembly.

12. The system of claim 11, wherein said overall momentum of said spacecraft is nominally zero.

13. The system of claim 12, wherein said spin axis of said spacecraft has an attitude that is not nominally inertially fixed.

14. The system of claim 13, wherein said spacecraft is a satellite.

15. The system of claim 14, wherein said spin axis of said spacecraft is pointed at Earth throughout said orbit of said satellite.

16. The system of claim 15, wherein said bearing and power transfer assembly maintains a nominal relative rotation rate of said payload module with respect to said bus module of $\omega_A*(1+I_A/I_B)$, wherein $\omega_A$ is the angular velocity of said payload module, $I_A$ is the moment of inertia of said payload module, and $I_B$ is the moment of inertia of said bus module.

17. A bearing and power transfer assembly for a spacecraft for providing nominally zero spacecraft momentum about a spin axis of said bearing and power transfer assembly comprising:

a first end in communication with a first body with a moment of inertia $I_A$ for spinning said first body at an inertial rate $\omega_A$;

a second end in communication with a second body with a moment of inertia $I_B$ for spinning said second body at an inertial rate $\omega_B$; and whereby said first body is spun relative to said second body at a nominal rate of $\omega_A*(1+I_A/I_B)$.

18. The assembly of claim 17, wherein said spin axis of said assembly is pointed at Earth throughout said orbit of said spacecraft.

19. The assembly of claim 17, wherein said first body is a payload module.

20. The assembly of claim 19, wherein said second body is a bus module.

* * * * *